US012800813B2

(12) United States Patent
You et al.

(10) Patent No.: US 12,800,813 B2
(45) Date of Patent: Nov. 17, 2026

(54) POLARIZING PLATE AND OPTICAL DISPLAY DEVICE

(71) Applicant: SAMSUNG SDI CO., LTD., Yongin-si (KR)

(72) Inventors: Jung Hun You, Suwon-si (KR); Bong Choon Kim, Suwon-si (KR); Seong Hoon Lee, Suwon-si (KR)

(73) Assignee: HOARDSUN HENGXIN(WUXI) MATERIALS CO., LTD., Wuxi (CN)

( * ) Notice: Subject to any disclaimer, the term of this patent is extended or adjusted under 35 U.S.C. 154(b) by 218 days.

(21) Appl. No.: 18/740,156

(22) Filed: Jun. 11, 2024

(65) Prior Publication Data

US 2024/0411077 A1 Dec. 12, 2024

(30) Foreign Application Priority Data

Jun. 12, 2023 (KR) ........................ 10-2023-0074730

(51) Int. Cl.
*G02B 5/30* (2006.01)
*G02F 1/1335* (2006.01)
*G02F 1/13363* (2006.01)

(52) U.S. Cl.
CPC ......... *G02B 5/3025* (2013.01); *G02B 5/3083* (2013.01); *G02F 1/133528* (2013.01); *G02F 1/133637* (2021.01); *G02F 1/133634* (2013.01); *G02F 2201/503* (2013.01);
(Continued)

(58) Field of Classification Search
CPC .... G02B 5/3025; G02B 5/3083; G02B 5/305; G02F 1/133528; G02F 1/133637; G02F 1/133634; G02F 2201/503; G02F 2202/02; G02F 2413/02; G02F 2413/06; G02F 2413/13; G02F 1/13363; C08L 1/08
See application file for complete search history.

(56) References Cited

U.S. PATENT DOCUMENTS

2013/0249378 A1 9/2013 Murakami et al.
2021/0165149 A1 * 6/2021 Yoon .................... G02B 5/3016

FOREIGN PATENT DOCUMENTS

JP 2007090613 A * 4/2007
KR 10-2013-0103595 A 9/2013
TW I520991 B * 2/2016 ................ C08L 1/10
(Continued)

OTHER PUBLICATIONS

Taiwanese Office Action dated Apr. 14, 2025, issued in corresponding Taiwanese Patent Application No. 113121517 (7 pages).

*Primary Examiner* — Shan Liu
(74) *Attorney, Agent, or Firm* — Ricky Lam

(57) ABSTRACT

A polarizing plate and an optical display device are disclosed. A polarizing plate includes a polarizer, and a retardation layer laminated on a surface of the polarizer, the retardation layer includes a retardation film that satisfies a relationship of nx>nz>ny, where nx, ny, and nz are indexes of refraction of the retardation film in a slow axis direction, a fast axis direction, and a thickness direction of the retardation film, respectively, at a wavelength of 550 nm, an alignment direction of a main chain of a resin contained in the retardation film with respect to a light transmission axis of the polarizer is in a range from −5° to +5°, and the retardation film has a degree of biaxiality of 0.2 to 0.6 at the wavelength of 550 nm.

14 Claims, 1 Drawing Sheet

(52) U.S. Cl.
CPC ...... *G02F 2202/02* (2013.01); *G02F 2413/02* (2013.01); *G02F 2413/06* (2013.01); *G02F 2413/13* (2013.01)

(56) References Cited

FOREIGN PATENT DOCUMENTS

| | | | | | |
|---|---|---|---|---|---|
| TW | I719700 B | | 2/2021 | | |
| TW | 202314300 A | * | 4/2023 | ............. | B32B 7/023 |

* cited by examiner

POLARIZING PLATE AND OPTICAL DISPLAY DEVICE

CROSS-REFERENCE TO RELATED APPLICATION

The present application claims priority to and the benefit of Korean Patent Application No. 10-2023-0074730, filed on Jun. 12, 2023 in the Korean Intellectual Property Office, the entire disclosure of which is incorporated herein by reference.

BACKGROUND

1. Field

Aspects of embodiments of the present invention relate to a polarizing plate and an optical display device including the same.

2. Description of the Related Art

Liquid crystal display devices include a liquid crystal panel as a panel for an optical display device, a viewer-side polarizing plate laminated on an upper surface of the liquid crystal panel, and a light source-side polarizing plate laminated on a lower surface of the liquid crystal panel. Among methods of driving the liquid crystal panel, a transverse electric field method is a method of aligning liquid crystal compounds in an in-plane direction of a substrate of the liquid crystal panel by an electric field containing components substantially parallel to the surface of the substrate. The transverse electric field method includes an in-plane switching (IPS) method, a fringe field switching (FFS) method, or the like. By providing a retardation layer between the liquid crystal panel and a polarizer, the transverse electric field method can increase a contrast ratio and a viewing angle and minimize or reduce color change.

The background technology of the present invention is disclosed in Korean Patent Application Publication No. 2013-0103595.

SUMMARY

According to an aspect of embodiments of the present invention, a polarizing plate including a retardation film of a single layer and capable of improving visibility across all viewing angles and minimizing or reducing color change is provided.

According to another aspect of embodiments of the present invention, a polarizing plate including a retardation film of a single layer and capable of improving light leakage by reducing a maximum light transmittance in a black mode across all viewing angles is provided.

According to another aspect of embodiments of the present invention, a polarizing plate including a retardation film of a single layer and thus exhibiting an excellent thickness-reducing effect is provided.

According to another aspect of embodiments of the present invention, a polarizing plate including a retardation film of a single layer and capable of being manufactured with a wide width in a transverse direction is provided.

According to an embodiment, a laminate of a positive C (+C) retardation layer and a positive A (+A) retardation layer may be used as the retardation layer. For example, in the polarizing plate, the polarizer, the +C layer, a photo-sensitive adhesive layer, and the +A layer may be laminated in that order. The polarizing plate may include two retardation layers of the +C layer and the +A layer. Thus, in order to provide the effect of thinning the polarizing plate, the retardation layer may be formed of a single layer.

According to one or more embodiments of the present invention, a polarizing plate includes a polarizer, and a retardation layer laminated on a surface of the polarizer, wherein the retardation layer includes a retardation film that satisfies the relationship of nx>nz>ny, where nx, ny, and nz are indexes of refraction of the retardation film in a slow axis direction, a fast axis direction, and a thickness direction of the retardation film, respectively, at a wavelength of 550 nm, an alignment direction of a main chain of a resin contained in the retardation film with respect to a light transmission axis of the polarizer is in a range from −5° to +5°, and the retardation film has a degree of biaxiality of 0.2 to 0.6 at the wavelength of 550 nm.

According to an embodiment, an optical display device includes the polarizing plate according to an embodiment.

According to one or more embodiments of the present invention, a polarizing plate including a retardation film of a single layer and capable of improving visibility across all viewing angles and minimizing or reducing color change is provided.

According to one or more embodiments of the present invention, a polarizing plate including a retardation film of a single layer and capable of improving light leakage by reducing a maximum light transmittance in a black mode across all viewing angles is provided.

According to one or more embodiments of the present invention, a polarizing plate including a retardation film of a single layer and thus exhibiting an excellent thickness-reducing effect is provided.

According to one or more embodiments of the present invention, a polarizing plate including a retardation film of a single layer and capable of being manufactured with a wide width in a transverse direction is provided.

BRIEF DESCRIPTION OF THE DRAWINGS

In FIG. 3, ■ represents the light transmittance when NZ of the retardation film is 0.4 at the wavelength of 550 nm, ● represents the light transmittance when NZ of the retardation film is 0.5 at the wavelength of 550 nm, and ▲ represents the light transmittance when NZ of the retardation film is 0.6 at the wavelength of 550 nm.

DETAILED DESCRIPTION

Figure 1:
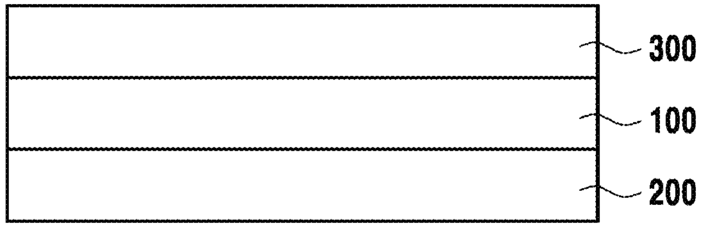
FIG. 1 is a cross-sectional view of a polarizing plate according to an embodiment.

The present invention will be described in further detail with reference to the accompanying drawings, such that the present invention can be easily implemented by those skilled in the art. It is to be understood that the present invention may be implemented in different ways and is not limited to the embodiments described herein.

In the drawings, parts which are not related to the description may be omitted to clearly describe the present invention, and the same or similar components are denoted by the same reference numerals throughout the specification. In the drawings, a length and size of each component may be provided to describe the present invention; however, the present invention is not limited to the length and size of each component shown in the drawings.

The terms used herein are used to describe some example embodiments, and are not intended to limit the present invention. A singular expression includes a plural expression unless the context clearly indicates otherwise.

In the present specification, "in-plane retardation Re," is represented by the following Equation A, "thickness direction retardation Rth," is represented by the following Equation B, and "degree of biaxiality NZ" is represented by the following Equation C.

$$Re = (nx - ny) \times d; \quad \text{Equation A}$$

$$Rth = ((nx + ny)/2 - nz) \times d; \quad \text{Equation B}$$

$$NZ = (nx - nz)/(nx - ny), \quad \text{Equation C}$$

where, in Equations A to C, nx, ny, and nz are indexes of refraction of an optical device in a slow axis direction, a fast axis direction, and a thickness direction of the optical device at a measurement wavelength, respectively, and d is a thickness of the optical device (unit: nm).) In Equations A to C, the measurement wavelength may be a specific wavelength selected from 450 nm to 650 nm.

In the present specification, unless otherwise stated, nx, ny, and nz refer to indexes of refraction of an optical device in a slow axis (an axis with the maximum refractive index in an in-plane direction) direction, a fast axis (an axis with the minimum refractive index in the in-plane direction) direction, and a thickness direction of the optical device at a wavelength of 550 nm.

As used herein, when describing an angle, "+" refers to a counterclockwise direction around a reference point and "−" refers to a clockwise direction around the reference point.

In the present specification, the term "light transmittance" refers to a total light transmittance rather than an orthogonal light transmittance.

Herein, the term "(meth)acryl" refers to acryl and/or methacryl.

As used herein, to represent a numerical range, the expression "X to Y" refers to "greater than or equal to X and less than or equal to Y (X≤ and ≤Y)".

A polarizing plate according to an embodiment includes a retardation film of a single layer. The polarizing plate improves visibility across all viewing angles, minimizes or reduces color change, improves light leakage by reducing a maximum light transmittance in a black mode across all viewing angles, and has an excellent thickness-reducing effect. In this context, "reducing the maximum light transmittance" refers to reducing the degree of light transmittance of light in the black mode, which is emitted across all viewing angles when the polarizing plate is applied to the optical display device and operated, thus preventing or substantially preventing light leakage.

In an embodiment, the smaller the maximum light transmittance, the more desirable it may be. In an embodiment, the maximum light transmittance may be less than or equal to 0.9%, for example, 0 to 0.5%, 0 to 0.3%, 0.1 to 0.4%, or 0.1 to 0.3%.

The polarizing plate according to an embodiment includes a retardation film of a single layer, and the retardation film may be manufactured with a wide width in a transverse direction, thereby increasing processability and economic feasibility when manufacturing a polarizing plate.

The polarizing plate according to an embodiment includes a polarizer and a retardation layer laminated on a surface of the polarizer, wherein the retardation layer includes a retardation film that satisfies the relationship of nx>nz>ny, where nx, ny, and nz are indexes of refraction of the retardation film in a slow axis direction, a fast axis direction, and a thickness direction of the retardation film, respectively, at a wavelength of 550 nm, an alignment direction of a main chain of a resin contained in the retardation film with respect to a light transmission axis of the polarizer is in a range from −5° to +5°, and the retardation film has a degree of biaxiality of 0.2 to 0.6 at the wavelength of 550 nm.

The polarizing plate may be a viewer-side polarizing plate or a light source-side polarizing plate.

According to an embodiment, the retardation layer may be located between the polarizer of the viewer-side polarizing plate and a panel (e.g., a liquid crystal panel) for an optical display device. In an embodiment, a light absorption axis of the polarizer of the viewer-side polarizing plate and an alignment direction of liquid crystals of the panel may be substantially orthogonal to each other.

According to another embodiment, the retardation layer may be located between the polarizer of the light source-side polarizing plate and the panel for an optical display device. In an embodiment, a light absorption axis of the polarizer of the light source-side polarizing plate and the alignment direction of the liquid crystals of the panel may be substantially orthogonal to each other.

In an embodiment, the retardation film is a retardation film of a single layer. This provides an effect of reducing a thickness of the polarizing plate and improved processability and economic feasibility in the manufacture of the polarizing plate. Herein, "retardation film of a single layer" refers to a retardation film composed of only one layer, not two or more retardation films bonded by a photo-sensitive adhesive layer, an adhesive layer, or the like.

According to an embodiment, a thickness of the retardation film may be 40 to 100 μm, for example, 40, 45, 50, 55, 60, 65, 70, 75, 80, 85, 90, 95, or 100 μm, for example, 40 to 80 μm. In this range, the retardation film can be applied to the polarizing plate, and can provide a thickness-reducing effect.

In an embodiment, the retardation layer may be formed of only the retardation film. This provides the effect of reducing a thickness of the polarizing plate and improved processability and economic feasibility in the manufacture of the polarizing plate.

According to an embodiment, in the polarizing plate, only the retardation film is present between the polarizer and an adherend (for example, a panel for an optical display device). In this case, in the polarizing plate, an adhesive layer, the retardation film, and a photo-sensitive adhesive layer may be sequentially laminated on a surface of the polarizer, and the photo-sensitive adhesive layer may be adhered to the adherend.

According to another embodiment, in the polarizing plate, the retardation film and one or more lower protective layers may be present between the polarizer and the adherend (for example, the panel for an optical display device). The lower protective layer may be present between the polarizer and the retardation film and/or between the retardation film and the adherend. In an embodiment, in the polarizing plate, an adhesive layer, the retardation film, a lower protective layer, and a photo-sensitive adhesive layer may be sequentially laminated on a surface of the polarizer, and the photosensitive adhesive layer may be adhered to the adherend.

In an embodiment, the lower protective layer may have an in-plane retardation of less than or equal to 10 nm, for example, 0, 1, 2, 3, 4, 5, 6, 7, 8, 9, or 10 nm, for example, 0 to 10 nm, at a wavelength of 550 nm. In the above range, the effect of protecting the polarizer can be provided without affecting the function and effect of the retardation film. The lower protective layer may be an optically transparent film or a coating layer. For example, the lower protective layer may be a film made of one or more resins selected from among cellulose resins including triacetylcellulose (TAC) and the like, polyester resins including polyethylene terephthalate (PET), polybutylene terephthalate, polyethylene naphthalate, polybutylene naphthalate, and the like, cyclic olefin copolymer (COC) resins, cyclic olefin polymer (COP) resins, polycarbonate resins, polyether sulfone resins, polysulfone resins, polyamide resins, polyimide resins, polyolefin resins, polyarylate resins, polyvinyl alcohol resins, polyvinyl chloride resins, polyvinylidene chloride resins, and acrylic resins.

In the retardation film, $nx>nz>ny$, where nx, ny, and nz are indexes of refraction of the retardation film in a slow axis direction, a fast axis direction, and a thickness direction of the retardation film, respectively, at a wavelength of 550 nm, and an alignment direction of a main chain of a resin contained in the retardation film with respect to a light transmission axis of the polarizer is in a range from −5° to +5°. This may facilitate providing the effect of improving visibility across all viewing angles, while minimizing or reducing color change and reducing light transmittance in the black mode across all viewing angles, even though the polarizing plate includes a retardation film of a single layer.

In the retardation film, $nx>nz>ny$ at the wavelength of 550 nm. This may ensure that $nx>ny$ and $0<(nx-nz)/(nx-ny)<1$, thereby reducing variation according to the viewing angle when using the retardation film, and improving a contrast ratio or visibility in black and white displays and facilitating reduction of color change when the retardation film is applied to a birefringent panel for an optical display device.

According to an embodiment, $(nx-ny)$ may be 0.0022 to 0.0075, for example, 0.0028 to 0.0075, and $(nx-nz)$ may be 0.00044 to 0.0045, for example, 0.00066 to 0.0038. In the above ranges, variation according to the viewing angle may be reduced when using the retardation film, and a contrast ratio or visibility in black and white displays may be improved and color change may be reduced when the retardation film is applied to the birefringent panel for an optical display device.

According to an embodiment, in the retardation film, nx may be 1.500 to 1.710, for example, 1.500, 1.550, 1.600, 1.650, 1.700, or 1.710, for example, 1.500 to 1.705, ny may be 1.480 to 1.700, for example, 1.480, 1.500, 1.550, 1.600, 1.650, or 1.700, for example, 1.485 to 1.700, and nz may be 1.500 to 1.705, for example, 1.500, 1.550, 1.600, 1.650, 1.700, or 1.705, for example, 1.500 to 1.700. In the above ranges, the above-described ranges of $(nx-ny)$ and $(nx-nz)$ can be easily achieved and the manufacture of the retardation film may be facilitated.

In an embodiment, an alignment direction of a main chain of a resin contained in the retardation film with respect to a light transmission axis of the polarizer is in a range from −5° to +5°. This can provide the effect of improving visibility across all viewing angles and reducing light transmittance in the black mode across all viewing angles by ensuring that the retardation film is manufactured using a composition for a retardation film to be described below, and enabling the retardation film to satisfy optical properties to be described below.

According to an embodiment, the alignment direction of the main chain of the resin contained in the retardation film may be in a range from −3° to +3°, or may be 0° with respect to the light transmission axis of the polarizer. In the above range, the effect described above can be achieved, and the processability of manufacturing the polarizing plate roll-to-roll can be improved by making a mechanical direction (MD) of the retardation film and a mechanical direction of the polarizer substantially parallel to each other.

The alignment direction of the main chain of the resin contained in the retardation film may be measured by conventional methods known to those skilled in the art. For example, the alignment direction of the main chain may be determined by visually examining a grain orientation of the retardation film in a stretching direction. For example, the alignment direction of the main chain may be determined by measuring a crystal structure of the resin in the retardation film by X-ray measurement of the retardation film, measuring a dynamic structure of the resin in the retardation film by nuclear magnetic resonance (NMR) measurement of the retardation film, and measuring an alignment direction through Raman and infrared spectroscopy. The light transmission axis of the polarizer may be in a transverse direction of the polarizer.

An angle formed by the alignment direction of the main chain of the resin contained in the retardation film and the light transmission axis of the polarizer may be implemented by adjusting an angle between the main chain direction and the light transmission axis of the polarizer when the retardation film is laminated on the polarizer.

According to an embodiment, the retardation film has a degree of biaxiality of 0.2 to 0.6 at a wavelength of 550 nm. If the degree of biaxiality is less than 0.2, the light transmittance in the black mode increases across all viewing angles, resulting in poor black visibility and the simultaneous observation of yellow and blue. If the degree of biaxiality is greater than 0.6, the light transmittance in the black mode increases across all viewing angles, resulting in poor black visibility and the simultaneous observation of yellow and blue. For example, the degree of biaxiality may be 0.2, 0.25, 0.3, 0.35, 0.4, 0.45, 0.5, 0.55, or 0.6, for example, 0.4 to 0.6, and in the above range, significantly excellent effects can be achieved.

According to an embodiment, the retardation film exhibits a value of Equation 1 between 0.8 and 1.2, and a range of Equation 2 between 0.9 and 1.1, and within these ranges of Equations 1 and 2, the retardation film may be manufactured with a composition for a retardation film to be described below, and may be useful in enhancing visibility across all viewing angles and reducing light transmittance in the black mode across all viewing angles. For example, the value of Equation 1 may be 0.8, 0.85, 0.9, 0.95, 1.0, 1.05, 1.1, 1.15, or 1.2, for example, 0.9 to 1.1, and the value of Equation 2 may be 0.9, 0.95, 1.0, 1.05, or 1.1, for example, 0.95 to 1.05.

$$Re(450\ nm)/Re(550\ nm); \quad \text{Equation 1}$$

$$Re(650\ nm)/Re(550\ nm), \quad \text{Equation 2}$$

where, in Equations 1 and 2, Re(450 nm), Re(550 nm), and Re(650 nm) are in-plane retardations of the retardation film at wavelengths of 450 nm, 550 nm, and 650 nm, respectively, (unit: nm).

According to an embodiment, the retardation film may have an in-plane retardation of 176 to 360 nm, for example, 176, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, or 360 nm, for example, 225 to 308 nm at a wavelength from 450 nm to 650 nm. In the above range, the value of Equation 1 and the value of Equation 2 can be easily obtained, and the light transmittance in the black mode can be reduced across all viewing angles.

According to an embodiment, the retardation film may have an in-plane retardation of 220 to 300 nm and a degree of biaxiality of 0.2 to 0.6 at the wavelength of 550 nm. In the above ranges, the effect of reducing the light transmittance in the black mode across all viewing angles can be easily provided. In an embodiment, the retardation film has an in-plane retardation of 220, 225, 230, 235, 240, 245, 250, 255, 260, 265, 270, 275, 280, 285, 290, 295, or 300 nm, for example, 250 to 280 nm, and a degree of biaxiality of 0.2, 0.25, 0.3, 0.35, 0.4, 0.45, 0.5, 0.55, or 0.6, for example, 0.4 to 0.6, at the wavelength of 550 nm. In the above ranges, the light transmittance can be significantly reduced to 0.3% or less.

Figure 3:
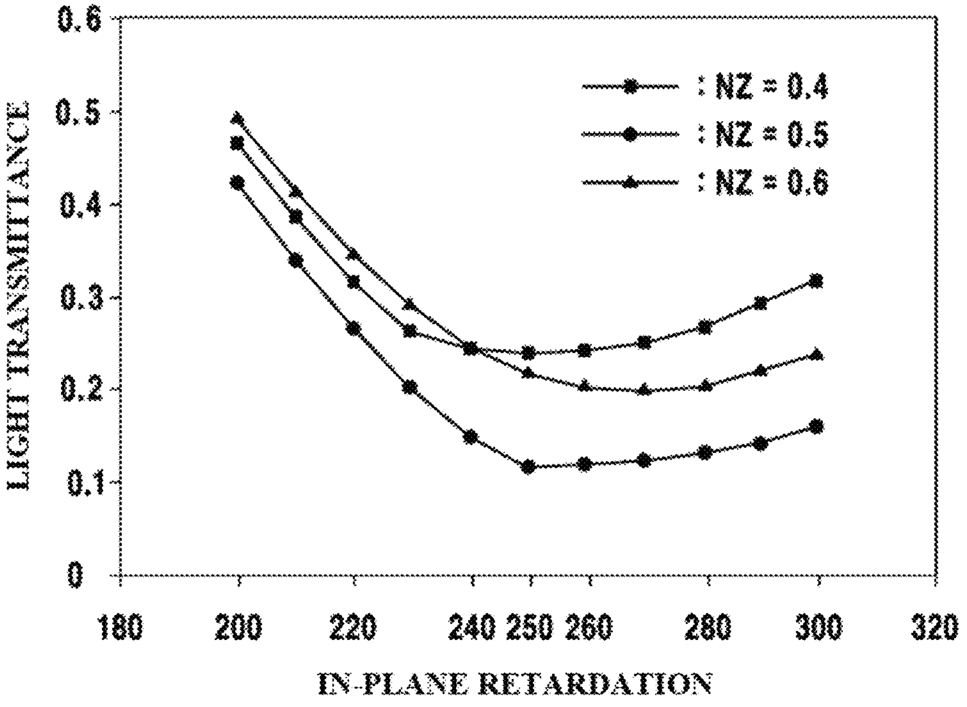
FIG. 3 illustrates a maximum light transmittance value (Y axis, unit: %) across all viewing angles according to a degree of biaxiality (NZ) and an in-plane retardation (X axis, unit: nm) of the retardation film at a wavelength of 550 nm, when the polarizing plate according to an embodiment is mounted on a device of a transverse electric field method and operated.

FIG. 3 illustrates a light transmittance value (Y axis, unit: %) according to a degree of biaxiality NZ and an in-plane retardation (X axis, unit: nm) of the retardation film at a wavelength of 550 nm, when the polarizing plate according to an embodiment is mounted on a panel corresponding to a transverse electric field method, for example, an in-plane-switching (IPS) liquid crystal panel, and operated.

In FIG. 3, ■ represents the light transmittance when NZ of the retardation film is 0.4 at the wavelength of 550 nm, ● represents the light transmittance when NZ of the retardation film is 0.5 at the wavelength of 550 nm, and ▲ represents the light transmittance when NZ of the retardation film is 0.6 at the wavelength of 550 nm.

Referring to FIG. 3, it can be seen that when the in-plane retardation of the retardation film is in a range from 250 to 280 nm and the degree of biaxiality of the retardation film is in a range from 0.4 to 0.6 at the wavelength of 550 nm, the light transmittance is significantly reduced to 0.3% or less.

The retardation film may be formed of a composition for a retardation film.

The composition for a retardation film may include a resin and at least one of Chemical Formulae I to IV described below. The composition for a retardation film may facilitate achieving the optical properties described above.

The resin is a cellulose ester resin, and the resin is included as a main component of the retardation film. Here, the term "main component" may mean a case in which the resin is included in an amount of 70 wt % or more, for example, 75 to 99 wt %, or 80 to 99 wt % based on a solid content of the retardation film or the composition for a retardation film.

The cellulose ester resin may include a cellulose ester resin regioselectively substituted with a plurality of aromatic-CO-groups, a plurality of first unsaturated or saturated $(C_{1-6})$alkyl-CO-groups, and a plurality of hydroxy groups as substituents.

Herein, the "aromatic-CO—" may be (i) an $(C_{6-20})$aryl-CO—, wherein the aryl is unsubstituted or substituted by 1-5 $R^1$, or (ii) a heteroaryl-CO—, wherein the heteroaryl is a 5- to 10-membered ring having 1 to 4 heteroatoms selected from N, O, and S, and the heteroaryl is unsubstituted or substituted by 1-5 $R^1$. $R^1$ follows the definition to be described below.

According to an embodiment, the regioselectively substituted cellulose ester resin may include a plurality of alkyl-acyl or alkyl-CO-groups, a plurality of aryl-acyl or aryl-CO-groups, and a plurality of heteroaryl-acyl or heteroaryl-CO-groups.

The acyl substituent or R—CO— will denote a substituent having the following structure.

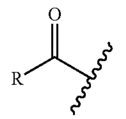

Such acyl or R—CO-groups in cellulose esters are generally bound to a pyranose ring of the cellulose through ester linkage (i.e., through an oxygen atom).

Aromatic-CO— may be an acyl substituent with an aromatic-containing ring system. Examples thereof may include aryl-CO— or heteroaryl-CO—. Specific examples include benzoyl, naphthoyl, and furoyl, each being unsubstituted or substituted.

The term "aryl-acyl" substituent will denote an acyl substituent in which "R" is an aryl group. The term "aryl" will denote a univalent group formed by removing a hydrogen atom from a ring carbon in an arene (i.e., a mono- or polycyclic aromatic hydrocarbon). In some cases, the aryl-acyl group is located before the carbon units: For example, $(C_{5-6})$aryl-acyl, $(C_{6-12})$aryl-acyl, or $(C_{6-20})$aryl-acyl. Examples of the aryl group suitable for use in various aspects include phenyl, benzyl, tolyl, xylyl, and naphthyl, but the present invention is not limited thereto. Such aryl groups may be substituted or unsubstituted.

The term "alkyl-acyl" will denote an acyl substituent in which "R" is an alkyl group. The term "alkyl" means a univalent group formed by removing a hydrogen atom from a non-aromatic hydrocarbon, and may include heteroatoms. Alkyl groups suitable for use herein may be straight, branched, or cyclic, and may be saturated or unsaturated. Alkyl groups suitable for use herein include any $(C_{1-20})$, $(C_{1-12})$, $(C_{1-5})$, or $(C_{1-3})$ alkyl groups. In various aspects, the alkyl may be a $C_{1-5}$ straight chain alkyl group. In another aspect, the alkyl may be a $C_{1-3}$ straight chain alkyl group. Specific examples of suitable alkyl groups include methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. Examples of alkyl-acyl groups include acetyl, propionyl, butyroyl, and the like.

The term "haloalkyl" means an alkyl substituent in which at least one hydrogen is replaced with a halogen group. The carbon units in the haloalkyl group are often included, for example, a halo$(C_{1-6})$alkyl. The haloalkyl group may be straight or branched. Non-limiting examples of haloalkyl include chloromethyl, trifluoromethyl, dibromo ethyl, and the like.

The term "heteroalkyl" means alkyl in which one or more carbon atoms are replaced with heteroatoms such as, for example, N, O, and S.

The term "heteroaryl" means an aryl in which one or more of the carbon units in the aryl ring is replaced with a heteroatom, such as O, N, or S. The heteroaryl ring may be monocyclic or polycyclic. Often, the units constituting the heteroaryl ring system include, for example, a 5- to 20-membered ring system. A 5-membered heteroaryl is a ring system having five atoms forming the heteroaryl ring. Non-limiting examples of heteroaryl include pyridine, quinoline, pyrimidine, thiophenyl, and the like.

The term "alkoxy" means alkyl-O— or an alkyl group terminally attached to an oxygen group. Often, the carbon units are included, for example, a $(C_{1-6})$alkoxy. Non-limiting examples of alkoxy include methoxy, ethoxy, propoxy, and the like.

The term "haloalkoxy" means an alkoxy in which one or more of the hydrogens are replaced with a halogen. Often the carbon units are included, for example, a halo$(C_{1-6})$ alkoxy. Non-limiting examples of haloalkoxy include trifluoromethoxy, bromomethoxy, 1-bromo-ethoxy and the like.

The term "halo" means a halogen such as fluoro, chloro, bromo, or iodo.

The term "degree of substitution (DS)" is used to describe the substitution level of the substituents of the substituents per anhydroglucose unit ("AGU"). In general, conventional cellulose includes three hydroxyl groups in each AGU that can be substituted. Thus, the DS may have a value between 0 and 3. However, low molecular weight cellulose mixed esters may have a total degree of substitution slightly above 3 from end group contributions. Since DS is a statistical mean value, a value of 1 does not assure that every AGU has a single substituent. In some cases, there may be unsubstituted anhydrous glucose units, some having two, some having three substituents, and more often the value is not an integer. Total DS is defined as the average number of all of substituents per anhydroglucose unit. The degree of substitution per AGU may also refer to a particular substituent, such as, for example, hydroxyl, acetyl, butyryl, or propionyl. In addition, the degree of substitution may designate the carbon unit of the anhydroglucose unit.

When the degree of substitution refers to hydroxyl (i.e., $DS_{OH}$), the reference means the average number of hydroxyl groups per anhydroglucose that are not substituted. As a result, $DS_{OH}$ is not used in the calculation of the total degree of substitution.

Regioselectivity may be measured by determining the relative degree of substitution ("RDS") at C6, C3, and C2 in the cellulose ester by carbon 13 NMR spectroscopy (literature: [*Macromolecules,* 1991, 24, 3050-3059]). In the case of one type of acyl substituent or when a second acyl substituent is present in a minor amount (DS<0.2), the RDS may be most easily measured directly by integration of the ring carbons. When two or more acyl substituents are present in similar amounts, in addition to determining the ring RDS, it is sometimes necessary to fully substitute the cellulose ester with an additional substituent in order to independently determine the RDS of each substituent by integration of the carbonyl carbons. In conventional cellulose esters, regioselectivity is generally not observed and the RDS ratio of C6/C3, C6/C2, or C3/C2 is generally near 1 or less. Essentially, conventional cellulose esters are random copolymers. In contrast, when one or more acylating reagents are added to cellulose dissolved in an appropriate solvent, the C6 position of cellulose is acylated much faster than C2 and C3 positions. As a result, the C6/C3 and C6/C2 ratios are significantly greater than 1, which is characteristic of a 6,3- or 6,2-enhanced regioselectively substituted cellulose ester.

According to an embodiment, the cellulose ester generally includes the following structure:

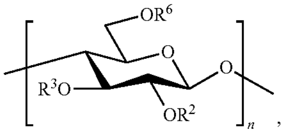

, where $R^2$, $R^3$, and $R^6$ are hydrogen (given that $R^2$, $R^3$, and $R^6$ are not hydrogen simultaneously), and/or alkyl-acyl groups and/or aryl-acyl groups bound to the cellulose via an ester linkage, and n is an integer greater than or equal to 1.

A degree of polymerization ("DP") of the cellulose esters prepared by these methods may be greater than or equal to 10, greater than or equal to 50, greater than or equal to 100, or greater than or equal to 250.

Acylating reagents suitable for use herein may include alkyl or aryl carboxylic anhydrides, carboxylic acid halides, and/or carboxylic acid esters containing the above-described alkyl or aryl groups suitable for use in the acyl substituents of the regioselectively substituted cellulose esters described herein, but the present invention is not limited thereto. Examples of suitable carboxylic anhydrides include acetic anhydride, propionic anhydride, butyric anhydride, pivaloyl anhydride, benzoic anhydride, and naphthoyl anhydride, but the present invention is not limited thereto. Examples of carboxylic acid halides include acetyl, propionyl, butyryl, pivaloyl, benzoyl, and naphthoyl chlorides or bromides, but the present invention is not limited thereto. Examples of carboxylic acid esters include acetyl, propionyl, butyryl, pivaloyl, benzoyl and naphthoyl methyl esters, but the present invention is not limited thereto. In one or more aspects, the acylating reagents may be one or more carboxylic anhydrides selected from the group consisting of acetic anhydride, propionic anhydride, butyric anhydride, pivaloyl anhydride, benzoyl anhydride, and naphthoyl anhydride.

The cellulose ester resin may include a cellulose ester resin regioselectively substituted with a plurality of aromatic-CO-groups, a plurality of first unsaturated or saturated $(C_{1-6})$alkyl-CO-groups, and a plurality of hydroxy groups, as substituents.

According to an embodiment, the cellulose ester resin has a hydroxyl degree of substitution of 0.2 to 2.0, a $C_2$ degree of substitution of 0.15 to 0.8, a C3 degree of substitution of 0.05 to 0.6, a C6 degree of substitution of 0.05 to 0.6, and a total degree of substitution of 0.25 to 2.5.

According to an embodiment, the cellulose ester resin has a hydroxyl degree of substitution of 0.2 to 2.0, a C2 degree of substitution by the aromatic-CO group or alkyl-CO group of 0.15 to 0.8, a C3 degree of substitution by the aromatic-CO group or alkyl-CO group of 0.05 to 0.6, a C6 degree of substitution by the aromatic-CO group or alkyl-CO group of 0.05 to 0.6, and a total degree of substitution by the aromatic-CO group or alkyl-CO group of 0.25 to 2.5.

The cellulose ester resin may have a degree of substitution for a first unsaturated or saturated $(C_{1-6})$alkyl-acyl substituent ("$DS_{FAk}$") of 0.7 to 2.2. In an aspect, the cellulose ester resin may have a degree of substitution for a first unsaturated or saturated $(C_{1-6})$alkyl-acyl substituent of 0.7 to 1.9.

In a class of this aspect, a first unsaturated or saturated $(C_{1-20})$ alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, or crotonyl. In a class of this aspect, the first unsaturated or saturated $(C_{1-6})$alkyl-CO— substituent is acetyl, propionyl, or crotonyl.

In an aspect or in combination with any other aspect, the cellulose ester resin may further include a plurality of second $(C_{1-20})$alkyl-CO-substituents. In a class of this aspect, a degree of substitution for the second $(C_{1-20})$alkyl-CO-substituent ("$DS_{SAk}$") is in a range from 0.05 to 0.6.

In a class of this aspect, the second $(C_{1-20})$alkyl-CO-substituent is acetyl, propionyl, butyryl, isobutyryl, 3-methylbutanoyl, pentanoyl, 4-methylpentanoyl, 3-methylpentanoyl, 2-methylpentanoyl, hexanoyl, pivalil, or 2-ethylhexanoyl. In one class of this aspect, the second $(C_{1-20})$alkyl-CO-substituent is acetyl, isobutyryl, 3-methylbutanoyl, pentanoyl, 4-methylpentanoyl, 3-methylpentanoyl, 2-methylpentanoyl, hexanoyl, or 2-ethylhexanoyl. In a class of this aspect, the second $(C_{1-20})$alkyl-CO-substituent is acetyl or 2-ethylhexanoyl.

In an aspect or in combination with any other aspect, the aromatic-CO— is a $(C_{6-20})$aryl-CO—, wherein the aryl is unsubstituted or substituted by 1-5 $R^1$. In a class of this aspect, the aromatic-CO— is benzoyl or naphthoyl, which is unsubstituted or substituted by 1-5 $R^1$. In a class of this aspect, the aromatic-CO— is benzoyl unsubstituted or substituted by 1-5 $R^1$. In a class of this aspect, the aromatic-CO— is naphthoyl unsubstituted or substituted by 1-5 $R^1$.

In an aspect or in combination with any other aspect, the aromatic-CO— is benzoyl unsubstituted or substituted by $R^1$. In a class of this aspect, the cellulose ester has a total $DS_{ArCO}$ of 0.4 to 1.2. In a sub-class of this class, a sum of $C3DS_{ArCO}$ and $C3DS_{ArCO}$ is in a range from 0.30 to 0.75.

In an aspect or in combination with any other aspect, the aromatic-CO— is naphthoyl unsubstituted or substituted by 1-5 $R^1$. In a class of this aspect, the cellulose ester has a total $DS_{ArCO}$ of 0.30 to 0.6. In a sub-class of this class, a sum of $C3DS_{ArCO}$ and $C3DS_{ArCO}$ is in a range from 0.20 to 0.40. In a sub-class of this class, a sum of $C3DS_{ArCO}$ and $C3DS_{ArCO}$ is in a range from 0.30 to 0.40.

In an aspect or in combination with any other aspect, the aromatic-CO— is heteroaryl-CO—, wherein the heteroaryl is a 5- to 10-membered ring having 1- to 4-heteroatoms selected from N, O, and S, and the heteroaryl is unsubstituted or substituted by 1-5 $R^1$. In a class of this aspect, the heteroaryl-CO— is pyridine-CO—, pyrimidine-CO—, furanyl-CO—, or pyrrolyl-CO—. In a class of this aspect, the heteroaryl-CO— is 2-furoyl.

In an aspect or in combination with any other aspect, the cellulose ester has a total $DS_{ArCO}$ ($totDS_{ArCO}$) of 0.4 to 1.6. In an aspect or in combination with any other aspect, the cellulose ester has a $totDS_{ArCO}$ of 1.0 to 1.6. In an aspect or in combination with any other aspect, the cellulose ester has a $totDS_{ArCO}$ of 0.3 to 1.25. In an aspect or in combination with any other aspect, the cellulose ester has a $totDS_{ArCO}$ of 0.4 to 1.2. In an aspect or in combination with any other aspect, the cellulose ester has a $totDS_{ArCO}$ of 0.4 to 0.8. In an aspect or in combination with any other aspect, the cellulose ester has a $totDS_{ArCO}$ of 0.3 to 0.8. In an aspect or in combination with any other aspect, the cellulose ester has a $totDS_{ArCO}$ of 0.3 to 0.6. In an aspect or in combination with any other aspect, the cellulose ester has a $totDS_{ArCO}$ of 0.2 to 0.6. In an aspect or in combination with any other aspect, the cellulose ester has a $totDS_{ArCO}$ of 0.2 to 0.5. In an aspect or in combination with any other aspect, the cellulose ester has a $totDS_{ArCO}$ of 0.8 to 1.2. In an aspect or in combination with any other aspect, the cellulose ester has a $totDS_{ArCO}$ of 0.5 to 1.1.

In an aspect or in combination with any other aspect, $DS_{OH}$ is in a range from 0.3 to 1.0. In an aspect or in combination with any other aspect, $DS_{OH}$ is in a range from 0.3 to 0.9. In an aspect or in combination with any other aspect, $DS_{OH}$ is in a range from 0.4 to 0.9. In an aspect or in combination with any other aspect, $DS_{OH}$ is in a range from 0.5 to 0.9. In an aspect or in combination with any other aspect, $DS_{OH}$ is in a range from 0.6 to 0.9. In an aspect or in combination with any other aspect, $DS_{OH}$ is in a range from 0.4 to 0.8. In an aspect or in combination with any other aspect, $DS_{OH}$ is in a range from 0.5 to 0.8.

In an aspect or in combination with any other aspect, a sum of $C_2DS_{ArCO}$ and $C3DS_{ArCO}$ is in a range from 0.3 to 1.25. In an aspect or in combination with any other aspect, a sum of $C2DS_{ArCO}$ and $C3DS_{ArCO}$ is in a range from 0.2 to 0.4. In an aspect or in combination with any other aspect, a sum of $C2DS_{ArCO}$ and $C3DS_{ArCO}$ is in a range from 0.3 to 0.4. In an aspect or in combination with any other aspect, a sum of $C2DS_{ArCO}$ and $C3DS_{ArCO}$ is in a range from 0.4 to 1.2. In an aspect or in combination with any other aspect, a sum of $C2DS_{ArCO}$ and $C3DS_{ArCO}$ is in a range from 0.4 to 1.1. In an aspect or in combination with any other aspect, a sum of $C2DS_{ArCO}$ and $C3DS_{ArCO}$ is in a range from 0.4 to 1.0. In an aspect or in combination with any other aspect, a sum of $C2DS_{ArCO}$ and $C3DS_{ArCO}$ is in a range from 0.5 to 1.1. In an aspect or in combination with any other aspect, a sum of $C2DS_{ArCO}$ and $C3DS_{ArCO}$ is in a range from 0.6 to 1.0. In an aspect or in combination with any other aspect, a sum of $C2DS_{ArCO}$ and $C3DS_{ArCO}$ is in a range from 0.6 to 1.25. In an aspect or in combination with any other aspect, a sum of $C2DS_{ArCO}$ and $C3DS_{ArCO}$ is in a range from 0.30 to 0.75.

The composition for a retardation film, that is, the retardation film, may include a component A having at least one of chemical Formulae I to IV:

Chemical Formula I

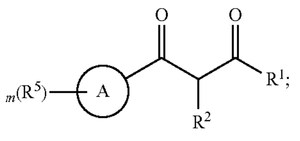

Chemical Formula II

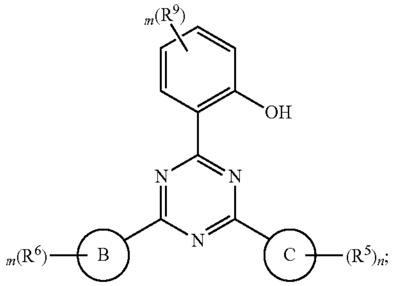

Chemical Formula III

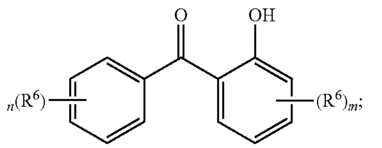

Chemical Formula IV

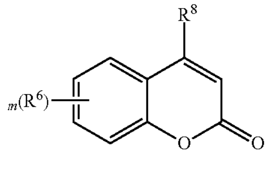

where, in Chemical Formulae I to IV, ring A is a $(C_{6-20})$aryl or a 5- to 10-member heteroaryl containing 1 to 4 heteroatoms selected from N, O, or S; ring B is $(C_{6-20})$aryl or a 5- to 10-membered heteroaryl containing 1 to 4 heteroatoms selected from N, O, or S; ring C is $(C_{6-20})$aryl or a 5- to 10-membered heteroaryl containing 1 to 4 heteroatoms selected from N, O, or S; $R^1$ is a saturated or unsaturated $(C_{1-20})$alkyl; a saturated or unsaturated halo$(C_{1-20})$alkyl; $(C_{6-20})$aryl optionally by 1-5 substituted by an alkyl, a haloalkyl, an alkoxy, a haloalkoxy, or a halo; a 5 to 10-membered heteroaryl containing 1 to 4 heteroatoms selected from N, O, or S; or —$CH_2C(O)$—$R^3$; $R^2$ is independently hydrogen, a saturated or unsaturated $(C_{1-20})$alkyl, or a saturated or unsaturated halo$(C_{1-20})$alkyl; $R^3$ is a saturated or unsaturated $(C_{1-20})$alkyl, a saturated or unsaturated halo$(C_{1-20})$alkyl, a $(C_{6-20})$aryl, or a 5 to 10-membered heteroaryl containing 1 to 4 heteroatoms selected from N, O, or S, wherein the aryl or heteroaryl is unsubstituted or substituted by 1-5 R6; $R^4$ is a saturated or unsaturated $(C_{1-20})$alkyl, a saturated or unsaturated halo$(C_{1-20})$alkyl, or a saturated or unsaturated $(C_{1-20})$alkyl-CO—$(C_{1-20})$alkyl, wherein each is unsubstituted or substituted by 1-3 hydroxyl, a saturated or unsaturated $(C_{1-20})$alkyl, a saturated or unsaturated halo$(C_{1-20})$alkyl, a saturated or unsaturated $(C_{1-20})$alkoxy, a saturated or unsaturated halo$(C_{1-20})$alkoxy, a saturated or unsaturated hydroxy $(C_{1-20})$alkyl, a saturated or unsaturated $(C_{1-20})$alkoxy-$(C_{1-20})$alkyl, a saturated or unsaturated $(C_{1-20})$alkoxy-hydroxy$(C_{1-20})$alkyl, a saturated or unsaturated $(C_{1-20})$alkoxy-$(C_{1-20})$alkyl-CO—$(C_{1-20})$alkyl, a saturated or unsaturated $(C_{1-20})$alkyl-CO, a saturated or unsaturated $(C_{1-20})$alkyl-COO, a saturated or unsaturated $(C_{1-20})$alkyl-O—CO—$(C_{1-20})$alkyl, a saturated or unsaturated $(C_{1-20})$alkyl-COO—$(C_{1-20})$alkyl, a saturated or unsaturated $(C_{1-20})$alkoxy-$(C_{1-20})$alkyl-COO—$(C_{1-20})$alkyl, or a $(C_{1-20})$alkoxy-$(C_{1-20})$alkyl-O—CO—$(C_{1-20})$alkyl; each $R^5$ is independently hydroxy, cyano, a saturated or unsaturated $(C_{1-20})$alkyl, saturated or unsaturated halo$(C_{1-20})$alkyl, a saturated or unsaturated $(C_{1-20})$alkoxy, a saturated or unsaturated halo $(C_{1-20})$alkoxy, or a halo; each $R^6$ is independently hydroxy, cyano, a saturated or unsaturated $(C_{1-20})$alkyl, a saturated or unsaturated halo$(C_{1-20})$alkyl, a saturated or unsaturated $(C_{1-20})$alkoxy, a saturated or unsaturated halo$(C_{1-20})$alkoxy, or a halo or $(C_{6-20})$aryl, wherein the aryl is unsubstituted or substituted by 1-5 $R^7$; each $R^7$ is independently hydroxyl, a saturated or unsaturated $(C_{1-6})$ alkyl, a saturated or unsaturated halo$(C_{1-6})$alkyl, or a saturated or unsaturated $(C_{1-6})$ alkoxy; $R^8$ is a saturated or unsaturated $(C_{1-20})$alkyl, a saturated or unsaturated halo$(C_{1-20})$alkyl, a saturated or unsaturated $(C_{1-20})$alkoxyl, or a saturated or unsaturated halo$(C_{1-20})$alkoxyl; each $R^9$ is $R^4$—O—, hydroxy, a saturated or unsaturated $(C_{1-20})$alkyl, a saturated or unsaturated hetero$(C_{1-20})$alkyl containing 1 or 2 heteroatoms selected from N, O and S, a saturated or unsaturated halo$(C_{1-20})$alkyl, a saturated or unsaturated $C_{1-20})$alkyl-CO—$(C_{1-20})$alkyl-, a saturated or unsaturated $(C_{1-20})$alkyl-COO—$(C_{1-20})$alkyl-, a saturated or unsaturated $(C_{1-20})$alkyl-COO—, a saturated or unsaturated $(C_{1-20})$alkyl-O—CO—, a saturated or unsaturated $(C_{1-20})$alkyl-CO—, a saturated or unsaturated $(C_{1-20})$alkoxy-$(C_{1-20})$alkyl-CO—O—$(C_{1-20})$alkyl, a saturated or unsaturated $(C_{1-20})$alkoxy-$(C_{1-20})$alkyl-O—CO—$(C_{1-20})$alkyl, a saturated or unsaturated $(C_{1-20})$alkoxy-$(C_{1-20})$alkyl-COO—$(C_{1-20})$alkyl, a $(C_{1-20})$alkoxy-$(C_{1-20})$alkyl-O—CO—$(C_{1-20})$alkyl-$(C_{6-10})$aryl, or a 5- to 10-membered heteroaryl containing 1 to 4 heteroatoms selected from N, O, and S, wherein each is unsubstituted or substituted by 1-3 hydroxyl, a saturated or unsaturated $(C_{1-20})$alkyl, a saturated or unsaturated halo$(C_{1-20})$alkyl, a saturated or unsaturated $(C_{1-20})$alkoxyl, a saturated or unsaturated halo$(C_{1-20})$alkoxyl, a saturated or unsaturated hydroxy$(C_{1-20})$alkyl, a saturated or unsaturated $(C_{1-20})$alkoxy-$(C_{1-20})$alkyl, a saturated or unsaturated $(C_{1-20})$alkoxy-hydroxy$(C_{1-20})$alkyl, a saturated or unsaturated $(C_{1-20})$alkoxy-$(C_{1-20})$alkyl-CO—$(C_{1-20})$alkyl-, a saturated or unsaturated $(C_{1-20})$alkyl-CO, a saturated or unsaturated $(C_{1-20})$alkyl-COO, a saturated or unsaturated $(C_{1-20})$alkyl-O—CO—$(C_{1-20})$alkyl, a saturated or unsaturated $(C_{1-20})$alkyl-COO—$(C_{1-20})$alkyl, a saturated or unsaturated $(C_{1-20})$alkoxy-$(C_{1-20})$alkyl-COO—$(C_{1-20})$alkyl, or a $(C_{1-20})$alkoxy-$(C_{1-20})$alkyl-O—CO—$(C_{1-20})$alkyl; each n is 0, 1, 2, 3, 4, or 5; each m is 0, 1, 2, 3, or 4; and k is 0, 1, 3, or 4.

According to an embodiment, the component A may be 1,3-diphenyl-1,3-propanedione, avobenzone, (2-hydroxy-4-(octyloxy)phenyl(phenyl)methanone, (2-hydroxy-4-methoxyphenyl)(2-hydroxyphenyl)methanone, 2-(4,6-diphenyl-1,3,5-triazin-2-yl)-5-(hexyloxy)phenol (Tinuvin 1577), 2-[4,6-bis(2,4-dimethylphenyl)-1,3,5-triazin-2-yl]-5-[2-hydroxy-3-(dodecyloxy- and tridecyloxy)propoxy]phenols (Tinuvin 400), isooctyl 2-(4-(4,6-di([1,1'-biphenyl]-4-yl)-1,3,5-triazin-2-yl)-3-hydroxyphenoxy)propanoate (Tinuvin 479), 6,6'-(6-(2,4-dibutoxyphenyl)-1,3,5-triazine-2,4-diyl)bis(3-butoxyphenol) (Tinuvin 460), 2-(4,6-bis(2,4-dimethylphenyl)-1,3,5-triazin-2-yl)-5-(3-((2-ethylhexyl)oxy)-2-hydroxypropoxy)phenol (Tinuvin 405), 7-diethylamino-4-methylcoumarin, or combinations thereof.

According to an embodiment, the component A may be present at greater than 1 wt %. In a class of this aspect, the component A may be present in a range of 1 to 30 wt %. In a class of this aspect, the component A may be present in a range of 1 to 20 wt %. In a class of this aspect, the component A may be present in a range of 1 to 15 wt %. In the above range, it is possible to easily implement the effects of the present invention.

In an embodiment, the composition for a retardation film may further include a plasticizer to increase workability and flexibility of the retardation film. In an embodiment, the plasticizer may be included in an amount of 0.1 wt % to 10 wt %, for example, 0.1 wt % to 5 wt %, based on a solid content of the retardation film or the composition for a retardation film. In the above range, a glass transition temperature and melting temperature of a material in which the retardation film is formed can be lowered, allowing for lower temperature and/or simplified film manufacturing.

The plasticizer may be selected from a phosphate-type plasticizer, a phthalate-type plasticizer, a terephthalate-type plasticizer, a trimelitate-type plasticizer, a benzoate-type plasticizer, a glycolate-type plasticizer, a citrate-type plasticizer, a polyhydric alcohol ester-type plasticizer, a polyol-type plasticizer, or a polyester-type plasticizer.

Non-limiting examples of glycolate plasticizers may include methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate and octyl phthalyl ethyl glycolate.

The retardation film may be manufactured by solution casting and stretching the composition for a retardation film. According to an embodiment, the retardation film may be manufactured by preparing a casting solution by using the composition for a retardation film itself or adding a solvent to the composition for a retardation film, applying the casting solution to a base substrate and drying the same to prepare an unstretched film, and stretching the unstretched film in a transverse direction (TD) of the unstretched film.

In an embodiment, the alignment direction of the main chain of the resin contained in the retardation film may be adjusted by adjusting the viscosity of the composition for a retardation film, the concentration of the resin in the composition for a retardation film, and the stretching direction and stretching ratio of the unstretched film during the manufacturing of the unstretched film.

In an embodiment, the slow axis of the retardation film with respect to the light absorption axis of the polarizer may be in a range from −5° to +5°, for example, from −3° to +3°, or may be 0°. In the above range, it is possible to easily implement the effects of the present invention.

In an embodiment, the slow axis of the retardation film may be substantially parallel to the mechanical direction of the retardation film.

The polarizer may convert incident natural light or polarized light into linearly polarized light in a specific direction. In an embodiment, the polarizer may have a thickness of 2 to 30 μm, and, in an embodiment, 4 to 25 μm, and may be used in the polarizing plate in the above range.

The polarizer may be manufactured by a conventional method known to those skilled in the art from a film containing a polyvinyl alcohol resin as a main component. For example, the polarizer may be a polarizer manufactured by iodine dyeing and stretching. The polarizer has a light absorption axis and a light transmission axis orthogonal to the light absorption axis in an in-plane direction, and the light absorption axis may be the MD and the light transmission axis may be the TD.

In an embodiment, the polarizing plate may further include one or more upper protective layers on an upper surface of the polarizer.

The upper protective layer may include one or more of an optically transparent protective coating layer and an optically transparent protective film. The protective coating layer may include a coating layer formed of a composition including an actinic radiation curable compound. The protective film is an optically transparent film, and may include a film formed of at least one selected from among, for example, cellulose resins including triacetylcellulose (TAC) and the like, polyester resins including polyethylene terephthalate (PET), polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, a TAC film or a PET film may be used.

In an embodiment, the upper protective layer may have a thickness of 0.1 to 100 μm, and, in an embodiment, 5 to 70 μm, and, in an embodiment, 15 to 45 μm, and may be used in the polarizing plate in the above ranges.

The upper protective layer may be adhered to an adherend by an adhesive layer. The upper protective layer may be omitted when omission of the upper protective layer does not impair the function of the polarizing plate.

The polarizing plate may further include a photo-sensitive adhesive layer on a lowermost surface thereof. The photo-sensitive adhesive layer may adhere the polarizing plate to a panel. The photo-sensitive adhesive layer may be formed of a photo-sensitive adhesive composition known to those skilled in the art.

Referring to FIG. 1, the polarizing plate may include a polarizer 100, an upper protective layer 300 laminated on an upper surface of the polarizer 100, and a retardation film 200 laminated on a lower surface of the polarizer 100.

Figure 2:
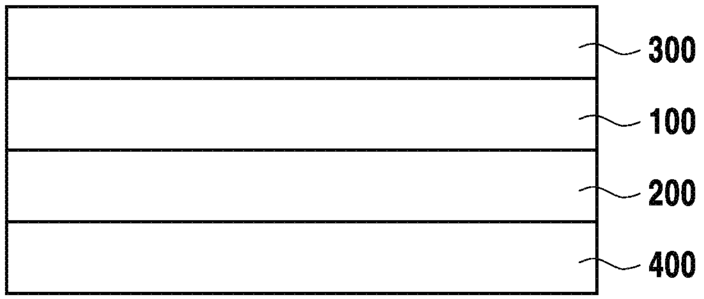
FIG. 2 is a cross-sectional view of a polarizing plate according to another embodiment.

Referring to FIG. 2, the polarizing plate may include a polarizer 100, an upper protective layer 300 laminated on an upper surface of the polarizer 100, and a retardation film 200 and a lower protective layer 400 sequentially laminated on a lower surface of the polarizer 100.

Optical Display Device

According to an embodiment, an optical display device includes the polarizing plate. The optical display device may include a liquid crystal display device. The polarizing plate may be included as a viewer-side polarizing plate in the optical display device. In an embodiment, the liquid crystal display device is a horizontal alignment mode liquid crystal display device, such as an in-plane switching (IPS) mode, fringe-field switching (FFS) mode, advanced super dimension switching (ADS) mode, or plane to line switching (PLS) mode liquid crystal display device.

According to an embodiment, the liquid crystal display device may include a liquid crystal panel, a viewer-side polarizing plate on a side surface of the liquid crystal panel, and a light source-side polarizing plate on another side surface of the liquid crystal panel. A light absorption axis of the polarizer of the viewer-side polarizing plate may be substantially orthogonal to a light absorption axis of the light source-side polarizing plate. When the light absorption axis of the polarizer of the viewer-side polarizing plate is 0°, the light absorption axis of the light source-side polarizing plate may be 90°, and a rubbing direction of the liquid crystal in the liquid crystal panel may be 90°. The viewer-side polarizing plate may include the polarizing plate according to an embodiment described above.

Herein, a configuration and operation of the present invention will be described in further detail through some examples of the present invention. However, it is to be understood that these examples are provided as examples of the present invention and are not to be construed in any way as limiting the scope of the present invention.

Example 1

An unstretched film was prepared using a composition for a retardation film (EASTMAN Chemical Ltd.) including a regioselectively substituted cellulose ester resin (with a propionyl group degree of substitution at C2 of 0.26, a propionyl group degree of substitution at C3 of 0.34, a propionyl group degree of substitution at C6 of 0.53, a propionyl group total degree of substitution of 2.33, and a hydroxyl degree of substitution of 1.87) by a solution casting method. The prepared unstretched film was stretched at a stretching ratio of 1.5 in the transverse direction of the unstretched film to prepare a retardation film (with an in-plane retardation of 270 nm, a degree of biaxiality of 0.4, a thickness of 56 μm, and nx=1.5323, ny=1.5275, and nz=1.5304 at a wavelength of 550 nm).

A polyvinyl alcohol film (TS #20, Kuraray Co., Ltd., Japan, a thickness before stretching: 20 μm) was stretched six times along an MD axis in an aqueous solution of 55 °C to prepare a polarizer with a total light transmittance of 45%.

A polyethylene terephthalate (PET) film having an anti-reflection layer formed thereon was laminated on an upper surface of the prepared polarizer, and the prepared retardation film was laminated on a lower surface of the polarizer to manufacture a polarizing plate. In the manufactured polarizing plate, an angle formed by a main chain direction of a regioselectively substituted cellulose ester resin in the retardation film with respect to a light transmission axis (the transverse direction of the polarizer) of the polarizer was 0°.

Examples 2 to 6

Polarizing plates were manufactured in the same manner as in Example 1, except that a regioselectively substituted cellulose ester resin having a degree of substitution changed from Example 1 was used, and a stretching ratio was changed.

Comparative Examples 1 to 4

Polarizing plates were manufactured in the same manner as in Example 1, except that the in-plane retardation and/or the degree of biaxiality of the retardation film and/or the stretching ration in Example 1 was changed.

The following physical properties were evaluated using the polarizing plates of the Examples and Comparative Examples, and are shown in Table 1 below and FIGS. 4 to 9.

(1) Optical properties of retardation film: Optical properties were measured using AxoScan for the retardation film.

(2) Angle: An angle of a main chain direction of the cellulose ester resin in the retardation film with respect to a light transmission axis of the polarizer in the polarizing plate obtained by measuring the light transmission axis of the polarizer using AxoScan while the polarizer and the retardation film were separated from each other, measuring the main chain direction of the cellulose ester resin by an X-ray diffraction (X-RD) method, and then calculating a relative angle thereof.

(3) Maximum light transmittance (unit: %): The polarizing plates manufactured in the Examples and Comparative Examples were attached to a Samsung Electronics TV model having an IPS liquid crystal panel instead of a viewer-side polarizing plate and driven. In addition, a maximum light transmittance in a black mode was calculated across all viewing angles based on the TechWiz 1 D (Sanayi System, Korea) simulation program. However, the reduction in light transmittance due to a color filter inside the panel was excluded from the above calculation. This means that light leakage can be prevented and visibility can be increased as the maximum light transmittance is lower.

(4) Black visibility and color: The polarizing plates manufactured in the Examples and Comparative Examples were attached to a Samsung Electronics TV model having an IPS liquid crystal panel instead of a viewer-side polarizing plate and driven. In addition, black visibility and color were evaluated by using a visual evaluation method.

The retardation films of the Examples and Comparative Examples satisfied the relationship of nx>nz>ny at a wavelength of 550 nm.

As shown in Table 1, the polarizing plate of the present invention includes a retardation film of a single layer, thereby improving visibility across all viewing angles, minimizing or reducing color change, and reducing a maximum light transmittance in a black mode across all viewing angles to provide a light leakage improvement effect. On the other hand, as shown in Table 1, the above-described effect in the polarizing plate of the Comparative Examples having the retardation film that does not satisfy optical properties of the present invention was lower than those of the Examples.

While some example embodiments of the present invention have been described herein, it will be understood that modifications or changes can be easily performed by those of ordinary skill in the art, and thus such modifications or changes are to be understood as included in the scope of the present invention.

What is claimed is:

1. A polarizing plate comprising:

a polarizer; and a retardation layer laminated on a surface of the polarizer, wherein the retardation layer comprises a retardation film that satisfies a relationship of nx>nz>ny, where nx, ny, and nz are indexes of refraction of the retardation film in a slow axis direction, a fast axis direction, and a thickness direction of the retardation film, respectively, at a wavelength of 550 nm, an alignment direction of a main chain of a resin contained in the retardation film with respect to a light transmission axis of the polarizer is in a range from −5° to +5°, and the retardation film has a degree of biaxiality of 0.2 to 0.6 at the wavelength of 550 nm;

wherein the resin is a cellulose ester resin comprising a cellulose ester resin regioselectively substituted with a plurality of aromatic-CO-groups, a plurality of first unsaturated or saturated ($C_{1-6}$)alkyl-CO-groups, and a plurality of hydroxy groups, as substituents; and in the cellulose ester resin, a hydroxyl degree of substitution is in a range from 0.2 to 2.0, a C2 degree of substitution is in a range from 0.15 to 0.8, a C3 degree of substitution is in a range from 0.05 to 0.6,

TABLE 1

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| Re (nm) | 270 | 270 | 220 | 300 | 270 | 240 | 270 | 220 | 270 | 300 |
| NZ | 0.4 | 0.5 | 0.5 | 0.5 | 0.6 | 0.2 | 0.1 | 0.1 | 0.9 | 0.1 |
| Angle (°) | 0 | 0 | 0 | 0 | 0 | 0 | 0 | 0 | 0 | 0 |
| Retardation thickness (μm) | 56 | 56 | 46 | 62 | 56 | 50 | 56 | 46 | 56 | 62 |
| Stretching ratio | 1.65 | 1.75 | 1.85 | 1.70 | 1.85 | 1.45 | 1.25 | 1.35 | 2.15 | 1.20 |
| Omnidirectional maximum light transmittance (%) | 0.25 | 0.12 | 0.27 | 0.16 | 0.20 | 0.81 | 1.31 | 1.24 | 1.17 | 1.37 |
| Black visibility | Excellent | Excellent | Excellent | Excellent | Excellent | Good | Poor | Poor | Poor | Poor |
| Color | Blue observed | Blue Observed | Light yellow observed | Strong blue observed | Blue observed | Light yellow observed | Light yellow and blue simultaneously observed | Light yellow and blue simultaneously observed | Light yellow and blue simultaneously observed | Light yellow and blue simultaneously observed |

a C6 degree of substitution is in a range from 0.05 to 0.6, and a total degree of substitution is in a range from 0.25 to 2.5.

2. The polarizing plate as claimed in claim 1, wherein the retardation film is a retardation film of a single layer.

3. The polarizing plate as claimed in claim 1, wherein the retardation film has an in-plane retardation of 220 to 300 nm at the wavelength of 550 nm.

4. The polarizing plate as claimed in claim 1, wherein, in the retardation film, a value of the following Equation 1 is in a range from 0.8 to 1.2, and a value of the following Equation 2 is in a range from 0.9 to 1.1:

$$Re(450\ nm)/Re(550\ nm); \quad \text{Equation 1}$$

$$Re(650\ nm)/Re(550\ nm), \quad \text{Equation 2}$$

where in Equations 1 and 2, Re(450 nm), Re(550 nm), and Re(650 nm) are in-plane retardations of the retardation film at wavelengths of 450 nm, 550 nm, and 650 nm, respectively (unit: nm).

5. The polarizing plate as claimed in claim 1, wherein a slow axis of the retardation film with respect to a light absorption axis of the polarizer is in a range from −5° to +5°.

6. The polarizing plate as claimed in claim 1, wherein a slow axis of the retardation film is parallel to a mechanical direction of the retardation film.

7. The polarizing plate as claimed in claim 1, wherein the retardation film is a transverse direction (TD)-stretched retardation film.

8. The polarizing plate as claimed in claim 1, wherein (nx−ny) is in a range from 0.0022 to 0.0075, and (nx−nz) is in a range from 0.00044 to 0.0045.

9. The polarizing plate as claimed in claim 1, wherein nx is in a range from 1.500 to 1.710, ny is in a range from 1.480 to 1.700, and nz is in a range from 1.500 to 1.705.

10. The polarizing plate as claimed in claim 1, wherein the resin is a main component of the retardation film.

11. The polarizing plate as claimed in claim 1, wherein the retardation layer is formed of only the retardation film.

12. The polarizing plate as claimed in claim 1, wherein the retardation film has a thickness of 40 μm to 100 μm.

13. The polarizing plate as claimed in claim 1, further comprising a protective layer laminated on another surface of the polarizer.

14. An optical display device comprising the polarizing plate as claimed in claim 1.

* * * * *